United States Patent [19]

O'Mara

[11] Patent Number: 4,535,410

[45] Date of Patent: Aug. 13, 1985

[54] POWER SUPPLY FAILURE EARLY WARNING DETECTOR

[75] Inventor: Bradley E. O'Mara, Sunnyvale, Calif.

[73] Assignee: Intersil, Inc., Cupertino, Calif.

[21] Appl. No.: 395,670

[22] Filed: Jul. 6, 1982

[51] Int. Cl.³ .................. G06F 15/20; G06G 7/62; G08B 21/00

[52] U.S. Cl. .................. 364/483; 340/663; 361/92; 361/110; 364/481

[58] Field of Search ............. 364/480, 481, 483, 550, 364/492, 557, 565; 340/636, 663; 361/88, 89, 92, 110, 111; 307/200 A

[56] References Cited

U.S. PATENT DOCUMENTS 3,914,667 10/1975 Waldron .................. 361/110 X
4,117,526 9/1978 Bates ........................ 361/92
4,428,020 1/1984 Blanchard, Jr. ........... 361/92 X Primary Examiner—Errol A. Krass
Assistant Examiner—Edward R. Cosimano
Attorney, Agent, or Firm—Spensley, Horn, Jubas & Lubitz

[57] ABSTRACT

Apparatus for detecting, in advance, by a desired length of time, the imminent failure of electric output power provided by an electric power supply due to the reduction or loss of input power. The magnitude of the voltage on an energy storage reservoir capacitor is monitored for deriving a voltage signal proportional to the rate of change thereof. The rate of change voltage is multiplied by a voltage proportional to a desired early warning time interval and this product is added to a voltage proportional to a minimum value of voltage on the capacitor, thus representing an amount of stored energy sufficient to sustain normal output power for a desired time interval. The voltage derived by the adding means is compared with the voltage on the energy storage capacitor for signalling imminent power supply failure when the compared voltages are equal.

16 Claims, 5 Drawing Figures $$\frac{dV_c}{dt} = \frac{I_L}{C_1} = K$$

$$\frac{dV_c}{dt} = \frac{I_c}{C_2} \neq K$$

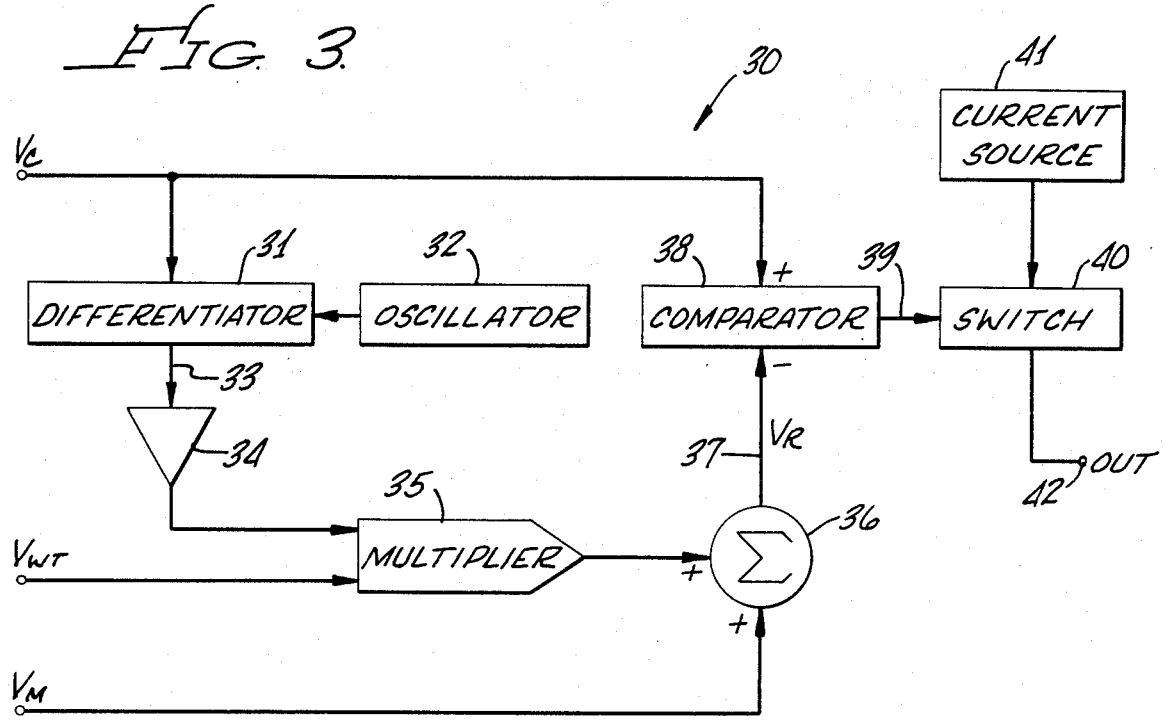

POWER SUPPLY FAILURE EARLY WARNING DETECTOR

BACKGROUND OF THE INVENTION

1. Field of the Invention

The present invention relates to a power supply failure early warning detector and, more particularly, to a circuit for detecting, in advance, by a desired length of time, the imminent failure of electric output power provided by an electric power supply due to the reduction or loss of input power.

2. Description of the Prior Art

There are many instances where it is necessary or desirable to provide an early warning of the imminent occurrence of an undesirable event. One such instance is in the case of an electric power supply which provides electric output power for a critical supply load where it is necessary to detect the imminent failure of the electric output power. Such critical supply loads include computers, medical equipment, communications equipment, military equipment and the like. In many cases, loss of electrical power, without warning, may result in disastrous consequences. For example, computers include memories which require power for the maintenance of the memory contents. If electric power is lost, without warning, all the data stored in the memory would typically be lost. In this case, as in many others, an early warning signal of imminent failure of electric power enables the powered system to commence orderly shutdown actions, such as the transfer of data to another storage device, thus preventing the loss of data or other undesirable event.

In view of this requirement, many power supplies include an early warning power failure detection circuit. Typically, such circuit includes a comparator which compares the instantaneous voltage upon an energy storage reservoir capacitor to a reference voltage which is arbitrarily chosen to be a predetermined amount greater than the minimum capacitor voltage at which normal power supply operation is possible. When the instantaneous voltage reaches this reference voltage, imminent power supply failure is signalled.

Such a scheme is undesirable because it fails to take into account the energy storage reservoir capacitor's characteristics which are a function of the power supply and the load current. The greater the load current, the more rapidly the energy storage reservoir capacitor will discharge. Knowing this, the reference voltage is selected based upon the worst case conditions, which is under maximum load conditions. Under partial load conditions, imminent power failure is signalled long before it is necessary to do so. The result is a high false alarm rate and the circuit's inability to respond in those situations where input power is lost only temporarily and is subsequently restored. Under such circumstances or under brown-out conditions, it is often unnecessary to signal imminent power failure, but this invariably occurs.

Another commonly used scheme is to monitor the alternating current input to a power supply. Each peak of an AC signal is used to trip a monostable multivibrator having a time delay of approximately 17 milliseconds, which is just longer than the time interval between consecutive peaks of an AC signal at 60 Hz. When the monostable multivibrator times out without sensing a new peak in the AC input signal, loss of AC power is assumed and imminent failure of the electric power supply is indicated.

This technique, too, has its limitations. The circuit may trigger in the presence of a decreased AC input voltage even though there is sufficient voltage to maintain operation of the power supply. Furthermore, the equipment operated by the power supply may in fact be able to maintain operation through many cycles of loss of AC input power such that if power comes back on after only a few cycles, it is not necessary to shut down. Since loss of a cycle or two in AC sources is common, these circuits too provide unnecessary false alarms.

Numerous other examples exist where it would be desirable to provide an early warning in the presence of a rising or lowering physical parameter. Another example would be in the case of a temperature sensing device where it would be desirable to provide an early warning of an imminent and undesirable increase or decrease in a temperature. Often these circumstances, too, are complicated by changing rates of the physical parameter. A circuit satisfying these requirements has been unavailable heretofore.

SUMMARY OF THE INVENTION

According to the present invention, these problems are solved by providing an early warning of the imminent occurrence of an undesirable event. The preferred embodiment of the invention is in the form of apparatus for detecting imminent failure of electric output power provided by an electric power supply, due to reduction or loss of input power. With the present apparatus, the changing physical parameters of the monitored apparatus are accounted for whereby imminent failure may be detected over a desired early warning time interval. In the case of imminent failure of electric output power provided by an electric power supply, failure is detected at a time such that the energy storage reservoir capacitor has stored therein just a sufficient amount of energy to sustain normal output power throughout the desired length of early warning time. By signalling failure at a constant time prior thereto, false alarms are substantially reduced because the circuit is highly insensitive to momentary losses of power, unless such momentary losses will in fact result in power failure.

Briefly, the present apparatus for detecting imminent failure of a power supply including an energy storage reservoir capacitor comprises means responsive to the voltage on the capacitor for deriving a voltage signal proportional to the rate of change thereof, means for multiplying the rate of change voltage by a voltage proportional to a desired early warning time interval, means for adding the product derived by the multiplying means to a voltage proportional to a minimum value of voltage on the capacitor, and means for comparing the voltage derived by the adding means with the voltage on the energy storage capacitor for signalling imminent power supply failure when the compared voltages are equal.

OBJECTS, FEATURES AND ADVANTAGES

It is therefore an object of the present invention to solve the problems encountered heretofore in detecting, in advance, the imminent occurrence of an undesired event. It is a feature of the present invention to solve these problems by detecting such failure a fixed length of time prior thereto. An advantage to be derived is a decreased sensitivity to false alarms.

It is another object of the present invention to solve the problems encountered heretofore in detecting, in advance, imminent failure of electric output power provided by an electric power supply due to reduction or loss of input power. It is a feature of the present invention to solve these problems by detecting failure a fixed length of time prior thereto. An advantage to be derived is the power supply's energy storage reservoir capacitor's discharge characteristics are accounted for. A further advantage is that detection of imminent failure is a function of supply current. A still further advantage is a substantially reduced false alarm rate.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

BRIEF DESCRIPTION OF THE DRAWINGS

FIG. 3 is a block diagram of a power supply failure early warning detector constructed in accordance with the teachings of the present invention.

DESCRIPTION OF THE PREFERRED EMBODIMENT

The present invention will be described in its preferred embodiment for detecting, in advance, by a desired length of time, the imminent failure of electric output power provided by an electric power supply due to reduction or loss of input power. However, the applicability of the present invention to other circuits and the monitoring of other physical parameters will become evident.

Electronic power supplies, especially those obtaining input power from alternating current (AC) sources, generally employ capacitive components to store energy in the form of electric charge. It is necessary to store energy to sustain continuous regulated output power to loads during the periodic absence of input power inherent of AC power sources. In other words, the capacitor(s) store energy during the presence of input power for release during its absence.

Converting AC input power to continuous regulated output power, required by most electronic loads, is generally accomplished by linear and/or switchmode power supplies. Both employ a capacitor(s) to store energy, although in significantly different amounts.

Figure 1A:
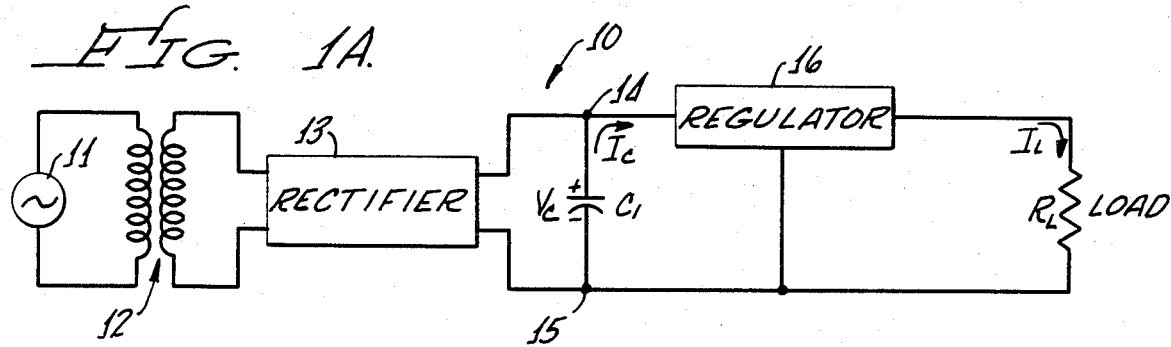
FIG. 1A is a simplified diagram of a linear power supply.

Referring now to the drawings and, more particularly, to FIG. 1A thereof, there is shown a typical diagram of a linear power supply, generally designated 10. AC power from a source 11 is coupled via a transformer 12 and a rectifier 13 to a pair of terminals 14 and 15, between which is connected an energy storage capacitor $C_1$, across which is developed a voltage $V_C$. The current delivered by capacitor $C_1$ is denoted by $I_C$. This current flows through a regulator 16 so that a current $I_L$ is delivered to a load represented by a resistor $R_L$.

Figure 1B:
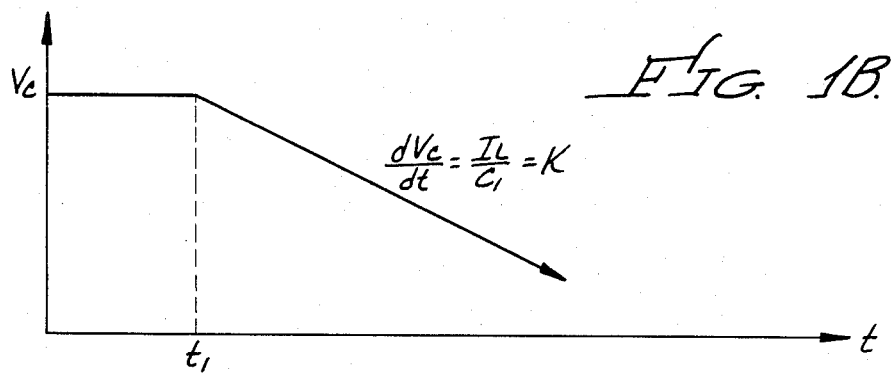
FIG. 1B is a discharge curve for the reservoir capacitor of the linear power supply of FIG. 1A.

FIG. 1B is a plot of capacitor voltage $V_C$ as a function of time t. It is seen that in the presence of AC input power, voltage $V_C$ remains relatively constant. Upon the loss of input power, at time $t_1$, the rate of change of voltage across capacitor $C_1$ as a function of time is equal to $I_L/C_1$ and is a constant (K). This means that capacitor $C_1$ will discharge linearly.

Figure 2A:
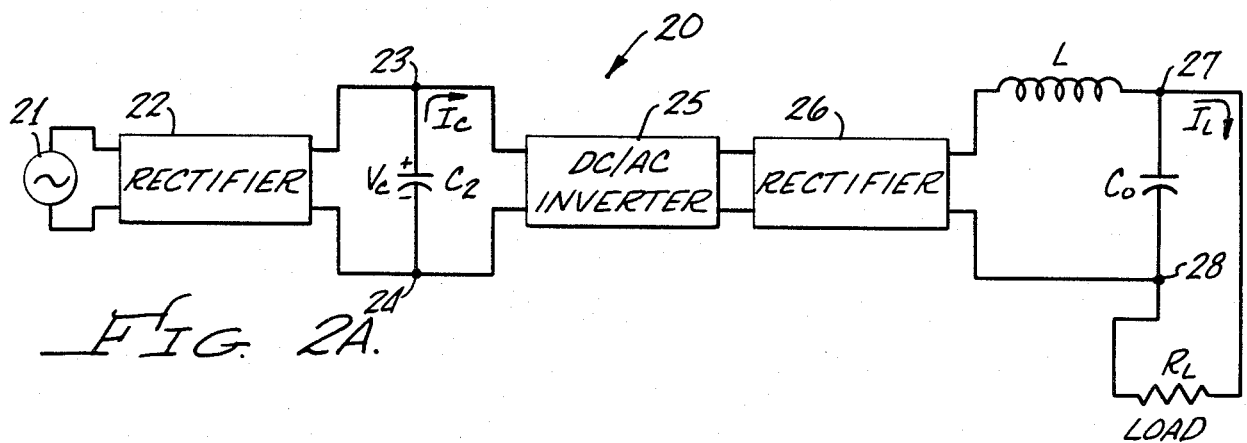
FIG. 2A is a simplified diagram of a switchmode power supply.

Referring now to FIG. 2A, there is shown a typical diagram of a switchmode power supply, generally designated 20. AC power from a source 21 is coupled via a rectifier 22 to a pair of terminals 23 and 24, between which is connected an energy storage capacitor $C_2$, across which is developed a voltage $V_C$ and through which is delivered a current $I_C$. This current is delivered by a DC/AC inverter 25, a rectifier 26 and an inductor L to output terminals 27 and 28, across which is connected a capacitor $C_O$ and a load represented by resistor $R_L$.

Figure 2B:
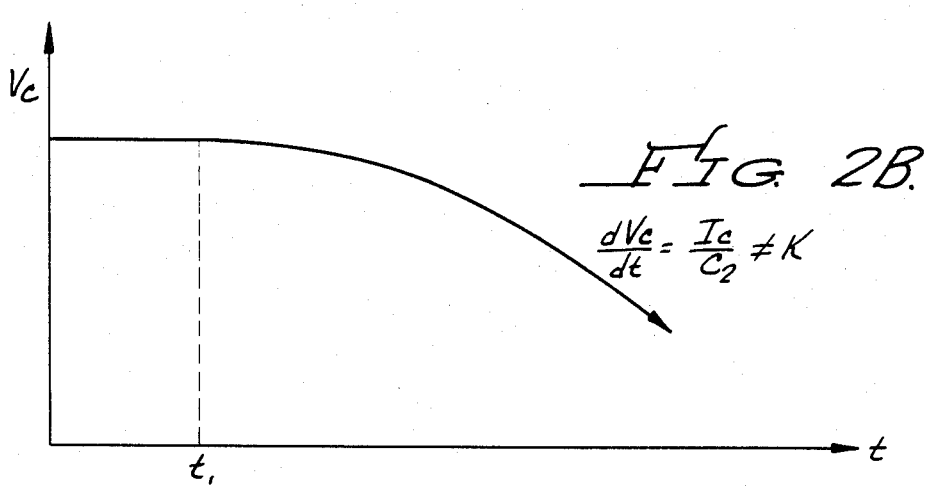
FIG. 2B is a discharge curve for the reservoir capacitor of the switchmode power supply of FIG. 2A.

FIG. 2B shows the discharge characteristics of power supply 20. Here it is seen that upon the loss of input power, at time $t_1$, the rate of change of voltage $V_C$ as a function of time is equal to $I_C/C_2$ which is not a constant.

According to the present invention, the discharge characteristics of capacitors $C_1$ and $C_2$, the energy storage reservoir capacitors, is used to obtain an early warning of power supply output failure. The length of time required for a capacitor's voltage to discharge to a known level is defined by its initial voltage and the rate of decay of its voltage. The rate of decay is defined by the load current. Conversely, a given length of energy storage discharge time can be represented by a finite change in capacitor voltage. This voltage can be added to a given minimum voltage which will allow normal power supply operation to compute a capacitor voltage representing stored energy just sufficient to allow normal supply operation throughout a given length of early warning discharge time. Detection of this computed capacitor voltage signals the instant in time which precedes, by the given early warning time duration, imminent power supply failure.

In other words, according to the present invention, apparatus is provided for monitoring both the magnitude and rate of change of the voltage on the power supply's energy storage reservoir capacitor. This information, together with a predetermined minimum capacitor voltage and a desired length of early warning time, is used to compute a dynamic trip level voltage which is then compared with the instantaneous capacitor voltage. When the instantaneous capacitor voltage decays to this calculated trip level voltage, imminent failure is signalled. At the instant of detection, the reserve capacitor voltage represents the amount of stored energy just sufficient to provide normal supply output power throughout the desired length of early warning time duration.

The above is implemented by multiplying a voltage proportional to the capacitor voltage rate of decay by a voltage proportional to the desired early warning time duration and adding the product to a voltage proportional to the minimum capacitor voltage at which normal power supply operation is possible. This sum is then compared with a voltage proportional to the instantaneous capacitor voltage. Detection and signalling of imminent failure occurs the instant the voltage proportional to the instantaneous capacitor voltage decays to this dynamic trip level voltage.

Referring now to FIG. 3, there is shown a detector circuit, generally designated 30, constructed in accordance with the teachings of the present invention. Circuit 30 requires three voltage inputs designated $V_C$, $V_{WT}$ and $V_M$. The voltage $V_C$ is the voltage across the power supply storage capacitor and would be derived from terminal 14 in FIG. 1A or terminal 23 in FIG. 2A. The voltage $V_{WT}$ is proportional to the desired early warning time duration and would be set by the user of detector 30. The voltage $V_M$ is proportional to the minimum capacitor voltage at which normal power supply operation is possible and would also be set by the user of detector 30. When capacitor $C_1$ or $C_2$ discharges below $V_M$, the operation of the circuit relying on the power supply is adversely affected.

$V_C$ is connected to one input of a differentiator 31 which receives a signal from an oscillator 32. Oscillator 32 establishes the time base for differentiator 31 which calculates, for each cycle of the input signal from oscillator 32, the change in $V_C$. Accordingly, the output of differentiator 31, on a line 33, is proportional to the rate of decay of the storage capacitor's voltage. This voltage is applied via an amplifier 34, which adjusts the level thereof, if desired, to one input of a multiplier 35, the other input of which is connected to receive the voltage $V_{WT}$. Multiplier 35 multiplies these two voltage signals and applies the product to one input of a summing circuit 36. The other input of summing circuit 36 is connected to receive the voltage $V_M$. The output of summing circuit 36, on a line 37, is thus a dynamic voltage $V_R$ indicative of the length of time required for $V_C$ to discharge to $V_M$ in an amount of time equal to the desired early warning time duration. The $V_R$ signal on line 37 is then compared with $V_C$, the voltage proportional to the instantaneous voltage across capacitor $C_1$ or $C_2$, in a comparator 38. Comparator 38 provides an output signal on a line 39 signalling imminent failure the instant $V_C$ decays to $V_R$.

According to a preferred embodiment of the invention, the output of comparator 38 on line 39 is applied to a normally closed switch 40 connected between a current source 41 and an output terminal 42. Thus, output terminal 42 is provided with current from source 41 during normal operation of the power supply. At the moment of failure detection, comparator 38 opens switch 40 to interrupt the current at terminal 42. The current at terminal 42 may be used to maintain a light source activated so that the failure detection signal is optically coupled and and does not rely on the power supply's electric output power.

It can therefore be seen that early warning of imminent failure is detected a constant length of time before actual failure, for a wide range of supply output power levels, by virtue of a dynamic trip level voltage computation. The computer trip level voltage varies according to the rate of capacitor voltage decay such that the reserve energy stored as charge on the capacitor is equal to the energy consumed by the supply load, plus any losses associated with necessary power conditioning, during the length of early warning time interval.

The application of detector 30 to the circuits of FIGS. 1A and 2A should be obvious. Linear power supply failure detection applications typically result in very small warning time errors due to the linearly decaying voltage across the reservoir capacitor. By utilizing a suitably high frequency for oscillator 32, the dynamic trip level voltage may be calculated at a high rate, such as every 500 microseconds, to minimize warning time errors should the discharge slope change with changing load conditions.

Switchmode power supply failure detection applications are identical to those for linear supplies, except for the increased warning time error term due to the nonlinear decaying voltage across the reservoir capacitor. In a switchmode power supply, the capacitor discharge current must continually increase as the DC/AC inverter circuit transfers power to the supply load at a constant rate. Because of this nonlinear capacitor voltage discharge rate, detector 30 again computes a new dynamic trip level voltage every 500 microseconds to minimize the resulting warning time error. The actual error depends on the application, but typically is less than 1 millisecond for desired warning times upwards of 10 to 20 milliseconds.

While the invention has been described with respect to the preferred physical embodiment constructed in accordance therewith, it will be apparent to those skilled in the art that various modifications and improvements may be made without departing from the scope and spirit of the invention. For example, while the present detector has been described in its preferred embodiment of detecting imminent failure of electric output power provided by an electric power supply, it will be obvious to those skilled in the art that it is not so limited. Detector 30 may be used to detect the change in a wide variety of physical parameters where the parameter is either rising or lowering at an approximately linear rate. Accordingly, it is to be understood that the invention is not to be limited by the specific illustrative embodiment, but only by the scope of the appended claims.

I claim:

1. Apparatus for detecting imminent failure of a power supply of the type including energy storage means comprising:
   means for monitoring the magnitude of the voltage and the rate of change of the voltage on said energy storage means;
   means responsive to said monitoring means for calculating a trigger value of voltage on said energy storage means in accordance with said rate of change of voltage on said energy storage means and a predetermined time interval so that said calculated trigger value of voltage represents an amount of stored energy sufficient to sustain normal output power for a desired time interval; and
   means responsive to said monitoring means and said calculating means for signalling imminent power supply failure when the voltage on said energy storage means reaches said calculated trigger value of voltage.

2. Apparatus for detecting imminent failure of a power supply of the type including energy storage means comprising:
   means for monitoring the magnitude of the voltage and the rate of change of the voltage on said energy storage means;
   means responsive to said monitoring means for calculating the value of voltage on said energy storage means representing an amount of stored energy sufficient to sustain normal output power for a desired time interval;
   means responsive to said monitoring means and said calculating means for signalling imminent power supply failure when the voltage on said energy storage means reaches said calculated value of voltage;

wherein said calculating means comprises:

means for multiplying the rate of change of voltage by a voltage proportional to said desired time interval; and means for adding the product derived by said multiplying means to a voltage proportional to a minimum value of voltage on said energy storage means capable of sustaining said normal output power.

3. Apparatus for detecting imminent failure of a power supply including energy storage means comprising:

means responsive to the voltage on said energy storage means for deriving a voltage proportional to the rate of change thereof;

means for multiplying said rate of change voltage by a voltage proportional to a desired early warning time interval;

means for adding the product derived by said multiplying means to a voltage proportional to a minimum value of voltage on said energy storage means; and means for comparing the voltage derived by said adding means with said voltage on said energy storage means for signalling imminent power supply failure when said compared voltages are equal.

4. Apparatus according to claim 3, wherein said rate of change voltage deriving means comprises:

means for generating a time base signal; and differentiator circuit means responsive to said voltage on said energy storage means and said time base signal for generating said rate of change voltage.

5. Apparatus according to claim 3 or 4, wherein said voltage proportional to said desired early warning time interval is a predetermined, fixed voltage.

6. Apparatus according to claim 5, wherein said voltage proportional to a minimum value of voltage on said energy storage means is a predetermined, fixed voltage.

7. Apparatus according to claim 3 or 4, wherein said voltage proportional to a minimum value of voltage on said energy storage means is a predetermined, fixed voltage.

8. Apparatus for detecting imminent failure of a power supply of the type including energy storage means comprising:

means responsive to the voltage on said energy storage means for deriving a signal $S_1$ proportional to the rate of change thereof;

means for multiplying $S_1$ by a signal $S_2$ proportional to a desired early warning time interval to derive a signal $S_3$;

means for summing $S_3$ with a signal $S_4$ proportional to a minimum voltage on said energy storage means at which normal power supply operation is possible to derive a signal $S_5$; and means for comparing $S_5$ with a signal $S_6$ proportional to said voltage on said energy storage means.

9. Apparatus according to claim 8, further comprising:

means for signalling imminent power supply failure when $S_6$ reaches $S_5$.

10. Apparatus according to claim 8 or 9, wherein said $S_1$ signal deriving means comprises:

means for generating a time base signal; and differentiator circuit means responsive to said voltage on said energy storage means and said time base signal for generating said signal $S_1$.

11. Apparatus according to claim 8 or 9, wherein said signal $S_2$ is a predetermined, fixed signal.

12. Apparatus according to claim 8 or 9, wherein said signal $S_4$ is a predetermined, fixed signal.

13. Apparatus for detecting the imminent occurrence of an event, which event is related to a physical parameter reaching a predetermined value, comprising:

means responsive to a voltage which varies in accordance with said physical parameter for deriving a voltage proportional to the rate of change thereof;

means for multiplying said rate of change voltage by a voltage proportional to a desired early warning time interval;

means for adding the product derived by said multiplying means to a voltage proportional to said predetermined value of said physical parameter; and means for comparing the voltage derived by said adding means with said voltage which varies in accordance with said physical parameter for signalling the imminent occurrence of said event.

14. Apparatus for detecting the imminent occurrence of an event, which event is related to a physical parameter reaching a predetermined value, comprising:

means responsive to a signal $S_1$ which is a function of said physical parameter for deriving a signal $S_2$ proportional to the rate of change thereof;

means for multiplying $S_2$ by a signal $S_3$ proportional to a desired early warning time interval to derive a signal $S_4$;

means for summing $S_4$ with a signal $S_5$ proportional to said predetermined value of said physical parameter to derive a signal $S_6$; and means for comparing $S_6$ with $S_1$.

15. Apparatus according to claim 14, further comprising:

means for signalling imminent occurrence of said event upon equality of $S_6$ and $S_1$.

16. Apparatus for detecting imminent failure of a power supply of the type including energy storage means for storing energy from an energy source, said energy being drawn from said energy storage means to supply power, said apparatus comprising:

means for sensing the level of energy stored in said energy storage means and for monitoring the rate at which energy is drawn from the energy storage means;

means for dynamically determining an energy level trigger value as a function of the rate of energy withdrawal from said energy storage means and a desired time interval of normal output power, said determined energy level trigger value representing an amount of stored energy sufficient to sustain normal output power for said desired time interval; and means responsive to said sensing means and determining means for signalling eminent power supply failure when the energy stored in said energy storage means reaches said determined energy level trigger value.

* * * * *